United States Patent
Mikolajczak et al.

(10) Patent No.: US 12,436,289 B2
(45) Date of Patent: Oct. 7, 2025

(54) TIME-OF-FLIGHT IMAGE SENSOR WITH QUANTUM DOT PHOTODETECTORS

(71) Applicant: Infineon Technologies AG, Neubiberg (DE)

(72) Inventors: Adrian Mikolajczak, Los Altos, CA (US); Muzammil Arain, Milpitas, CA (US)

(73) Assignee: Infineon Technologies AG, Neubiberg (DE)

( * ) Notice: Subject to any disclaimer, the term of this patent is extended or adjusted under 35 U.S.C. 154(b) by 603 days.

(21) Appl. No.: 17/836,451

(22) Filed: Jun. 9, 2022

(65) Prior Publication Data

US 2023/0408699 A1    Dec. 21, 2023

(51) Int. Cl.
| | | |
|---|---|---|
| G01S 17/894 | (2020.01) | |
| H04N 25/20 | (2023.01) | |
| H10F 39/18 | (2025.01) | |

(52) U.S. Cl.
CPC ........... *G01S 17/894* (2020.01); *H04N 25/20* (2023.01); *H10F 39/184* (2025.01)

(58) Field of Classification Search
None
See application file for complete search history.

(56) References Cited

U.S. PATENT DOCUMENTS

| | | | | |
|---|---|---|---|---|
| 2014/0275776 A1* | 9/2014 | Dutta | ................. | A61B 1/00034 600/109 |
| 2017/0110608 A1* | 4/2017 | Yang | .................... | H01L 27/1461 |
| 2017/0222076 A1* | 8/2017 | Furrer | ................. | H01L 27/1443 |

FOREIGN PATENT DOCUMENTS

| | | | | |
|---|---|---|---|---|
| CN | 106601859 A | * | 4/2017 | ..... H01L 31/035218 |
| EP | 3933434 A2 | * | 1/2022 | ............. G01N 21/27 |

OTHER PUBLICATIONS

Xu et al.; "Inverted Si:PbS Colloidal Quantum Dot Heterojunction-Based Infrared Photodetector", Mar. 11, 2020, Applied Materials & Interfaces, vol. 12, No. 13, pp. 1514-15421 (Year: 2020).*
Extended European Search Report for Application No. EP23178413. 3, mailed on Nov. 6, 2023, 11 pages.
Xu K., et al., "Inverted Si: PbS Colloidal Quantum Dot Heterojunction-Based Infrared Photodetector," ACS Applied Materials & Interfaces, Mar. 2020, vol. 12(13), pp. 15414-15421.

(Continued)

*Primary Examiner* — James M Anderson, II

(74) *Attorney, Agent, or Firm* — Harrity & Harrity, LLP

(57) ABSTRACT

A time-of-flight (ToF) sensor includes a photodetector array and a processing circuit. The photodetector array includes a plurality of photodetectors wherein each photodetector of the photodetector array includes a silicon-based, light-sensitive diode. Each silicon-based, light-sensitive diode includes a photosensitive layer comprising a plurality of quantum dot particles sensitive to a near infrared (NIR) region of an electromagnetic spectrum, wherein the plurality of quantum dot particles converts optical energy into electrical energy to generate an electrical current in response to receiving NIR light having a wavelength in the NIR region. The processing circuit is configured to receive the electrical current and calculate a time-of-flight of the received NIR light based on the electrical current.

24 Claims, 5 Drawing Sheets

(56) References Cited

OTHER PUBLICATIONS

Hu, Jinming et al. "Recent progress of infrared photodetectors based on lead chalcogenide colloidal quantum dots." Chinese Physics B. vol. 28, No. 2, 2019, pp. 1-14. DOI: 10.1088/1674-1056/28/2/020701.

Koifman, Vladimir et al. "ST to Present its Quantum Dot SWIR Sensor at IEDM 2021." Image Sensors World, 2021, http://image-sensors-world.blogspot.com/2021/10/st-to-present-ist-quantum-dot-swir.html.

Malinowski, Pawel E., et al. "Thin-Film Quantum Dot Photodiode for Monolithic Infrared Image Sensors." Sensors, vol. 17, 2017, pp. 1-10, DOI:10.3390/s17122867.

\* cited by examiner

TIME-OF-FLIGHT IMAGE SENSOR WITH QUANTUM DOT PHOTODETECTORS

BACKGROUND

Image sensors contribute to many of today's consumer electronics. It is estimated that the majority of the information that we produce now is video based. Image sensors play a vital role in capturing this data. Increasingly there is a demand to capture three-dimensional (3D) data as well. Time-of-flight (TOF) sensors are playing a major role in fulfilling this demand.

Nowadays, a majority of the consumer electronics cameras are complementary metal-oxide-semiconductor (CMOS) based and operate in the visible region. Near Infrared (NIR) is a subset of the infrared band of the electromagnetic spectrum, covering the wavelengths ranging from about 0.8 to 2.5 microns ($\mu m$), or 800-2500 nm. This wavelength is just outside the range of what humans can see and can sometimes offer better details than what is achievable with visible light imaging. The NIR region provides vital information in fields such as low-light/night vision, surveillance, sorting or biometrics, with content interpretation very similar to visible photography and imaging possible with no additional light source. Portions of the NIR spectrum are able to penetrate haze, light fog, smoke and other atmospheric conditions better than visible light. For long-distance imaging, this often results in a sharper, less distorted image with better contrast than what can be seen with visible light.

Unfortunately, the sharply decreasing absorption of silicon around the wavelength of 900 nm (for standard photocliode thickness) prevents further extension of usable quantum efficiency range. At the same time, dedicated infrared sensors are not yet easily accessible due to their significantly higher cost versus image sensors that are based on CMOS technology operating in the visible range. In addition, adding the III-V materials in silicon processing introduces the risk of contamination. Thus, infrared sensors, such as InGaAs based detectors, are not well suited for low cost, small form factor, and low power applications. Current infrared sensors are also bulky and require cooling, both of which are undesirable.

An alternate is to use Germanium, a group IV material, the same as silicon, and thus minimizing the risk of contamination. Ge/GeSi photodetectors offer much better quantum efficiency in the 1.3-1.55 $\mu m$. However, the small lattice mismatch between Si and Ge is still a manufacturing challenge in monolithic applications.

Accordingly, there is a need for a low cost, high efficiency process for TOF sensors that operate in the NIR spectrum. Additionally, there is a need for TOF sensors that can allow dual wavelength operation for both visible light (RGB) and NIR spectrums with high efficiency. Therefore, an improved ToF image sensor having an NIR detector may be desirable.

SUMMARY

One or more embodiments provide a time-of-flight (ToF) sensor that includes a photodetector array and a processing circuit. The photodetector array includes a plurality of photodetectors wherein each photodetector of the photodetector array includes a silicon-based, light-sensitive diode. Each silicon-based, light-sensitive diode includes a photosensitive layer comprising a plurality of quantum dot particles sensitive to a near infrared (NIR) region of an electromagnetic spectrum, wherein the plurality of quantum dot particles converts optical energy into electrical energy to generate an electrical current in response to receiving NIR light having a wavelength in the NIR region. The processing circuit is configured to receive the electrical current and calculate a time-of-flight of the received NIR light based on the electrical current.

One or more embodiments further provide a ToF sensor that includes a photodetector array and a processing circuit. The photodetector array includes a photodetector array comprising a plurality of photodetectors wherein each photodetector of the photodetector array includes a silicon-based, light-sensitive diode. Each silicon-based, light-sensitive diode includes a photosensitive layer comprising a plurality of quantum dot particles sensitive to an infrared (IR) region of an electromagnetic spectrum, wherein the plurality of quantum dot particles converts optical energy into electrical energy to generate an electrical current in response to receiving IR light having a wavelength in the IR region. The processing circuit is configured to receive the electrical current and calculate a time-of-flight of the received IR light based on the electrical current enabling a 3D map of the captured image to be generated.

One or more embodiments further provide a ToF sensor that includes a photodetector array and a processing circuit. The photodetector array includes a plurality of photodetectors wherein each photodetector of the photodetector array includes a variable conduction region comprising a plurality of quantum dot particles sensitive to a near infrared (NIR) region of an electromagnetic spectrum, wherein the plurality of quantum dot particles converts optical energy into electrical energy to generate an electrical current in response to receiving NIR light having a wavelength in the NIR region. The processing circuit is configured to receive the electrical current and calculate a time-of-flight of the received NIR light based on the electrical current.

BRIEF DESCRIPTION OF THE DRAWINGS

Embodiments are described herein making reference to the appended drawings.

DETAILED DESCRIPTION

Figure 1:
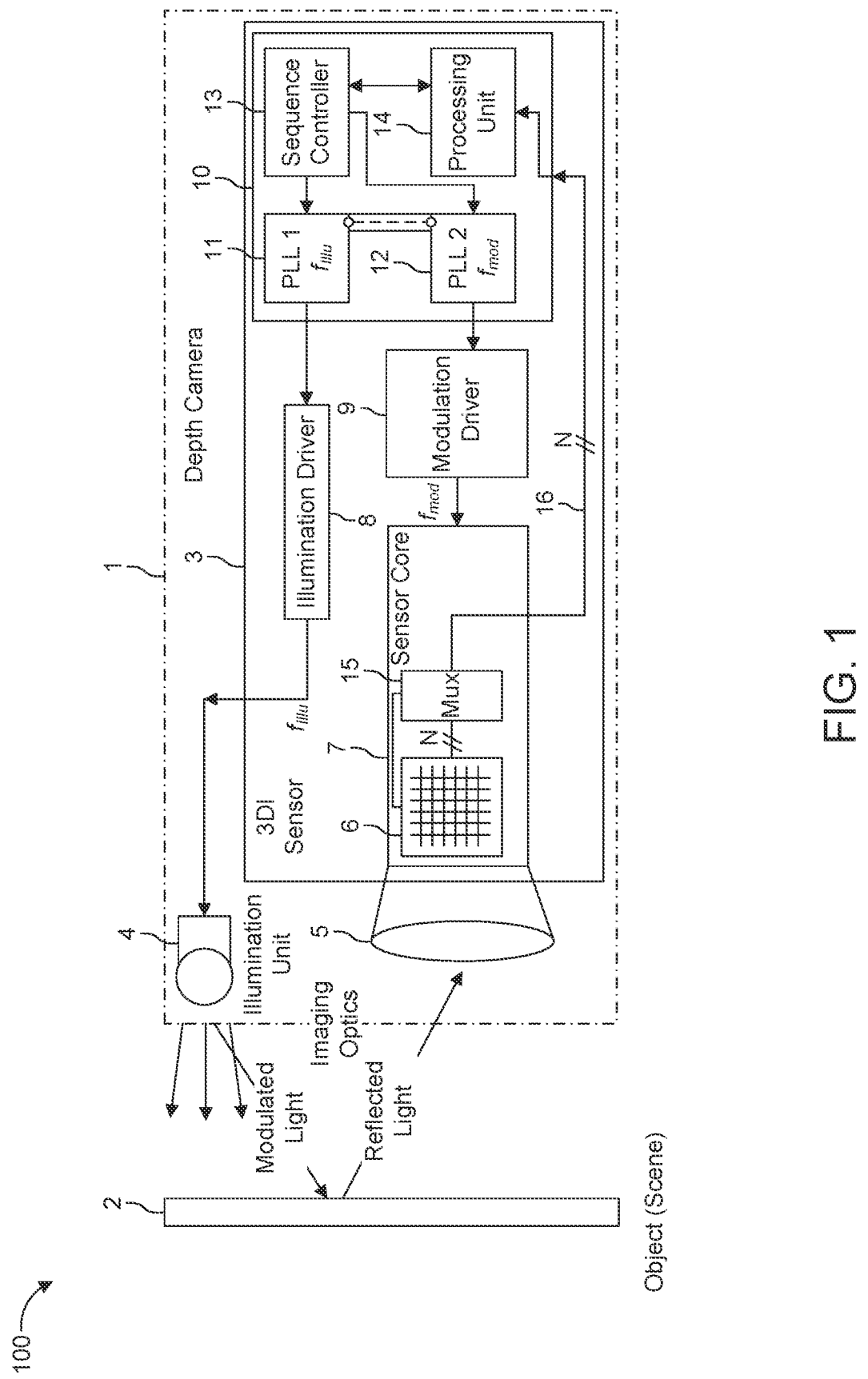
FIG. 1 is a schematic block diagram of a three-dimensional (3D) depth camera system according to one or more embodiments.

In the following, details are set forth to provide a more thorough explanation of the exemplary embodiments. However, it will be apparent to those skilled in the art that embodiments may be practiced without these specific details In other instances, well-known structures and devices are shown in block diagram form or in a schematic view rather than in detail in order to avoid obscuring the embodiments.

In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top", "bottom", "below", "above", "front", "behind", "back", "leading", "trailing", etc., may be used with reference to the orientation of the figures being described. Because parts of embodiments can be positioned in a number of different orientations, the directional terminology is used for purposes of illustration. It is to be understood that other embodiments may be utilized and structural or logical changes may be made without departing from the scope defined by the claims. The following detailed description, therefore, is not to be taken in a limiting sense. Directional terminology used in the claims may aid in defining one element's spatial or positional relation to another element or feature, without being limited to a specific orientation. For example, lateral, vertical, and overlapping spatial or positional relationships may be described in reference to another element or feature, without being limited to a specific orientation of the device as a whole.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

The terms "substantially" and "approximately" may be used herein to account for small manufacturing tolerances (e.g., within 5%) that are deemed acceptable in the industry without departing from the aspects of the embodiments described herein. For example, a resistor with an approximate resistance value may practically have a resistance within 5% of that approximate resistance value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

Embodiments relate to optical sensors and optical sensor systems and to obtaining information about optical sensors and optical sensor systems. A sensor may refer to a component which converts a physical quantity to be measured to an electric signal, for example a current signal or a voltage signal. The physical quantity may, for example, comprise electromagnetic radiation, such as visible light, infrared (IR) radiation, near infrared (NIR) radiation, or other type of illumination signal, a current, or a voltage, but is not limited thereto. For example, an image sensor may be a silicon chip inside a camera that converts photons of light coming from a lens into voltages. The larger the active area of the sensor, the more light that can be collected to create an image.

A sensor device as used herein may refer to a device which comprises a sensor and further components, for example biasing circuitry, an analog-to-digital converter or a filter. A sensor device may be integrated on a single chip, although in other embodiments a plurality of chips or also components external to a chip may be used for implementing a sensor device.

More specifically, the embodiments related to a time-of-flight (ToF) sensor configured to determine a depth (i.e., a distance) from a depth camera, or more specifically from a photodetector array, to one or more objects using a time-of-flight (ToF) principle. The ToF sensor may be a three-dimensional (3D) image sensor. In general, light (e.g., visible light, infrared light, and/or near infrared (NIR) light) is transmitted from the ToF sensor and is reflected back by the object. The reflected light is received by a photodetector array, where, on a photodetector-by-photodetector basis, the reflected light is demodulated during an image acquisition to generate a measurement signal. Each photodetector may be also configured to perform multiple image acquisitions at different acquisition times, and thereby generate multiple measurement signals therefrom. Each photodetector may be alternatively referred to as a pixel and may be made up one or more photodiodes, for example.

Indirect time-of-flight (ToF) three-dimensional image (3DI) sensors are based on continuously modulated light for scene illumination, and demodulation of the received light on a photodetector level during integration phases. In particular, continuous wave modulation uses continuous light waves instead of short light pulses and the modulation is done in terms of frequency of sinusoidal waves. For continuous wave modulation, a detected wave after reflection has a shifted phase, and the phase shift is proportional to distance from reflecting object or surface. Thus, the distance can be determined from the measured phase shift. Depth information is obtained by a calculation of pixel values from several image acquisitions with pre-defined and constant phase steps between light emission and pixel modulation. For example, four depth images may be used with discrete (congruent) phase differences of 0°/90°/180°/270° to estimate the depth value for each photodetector. This is in contrast to pulsed modulation, in which a system measures distance to a 3D object by measuring the absolute time a light pulse takes to travel from a source into the 3D scene and back, after reflection.

While specific embodiments may be described in the context of continuous wave ToF systems (i.e., indirect ToF systems), the concepts described herein may also be extended to direct ToF systems, such as Light Detection and Ranging (LIDAR) systems. Some LIDAR systems use pulsed modulation for measuring ToF and taking distance measurements. In this case, a light source transmits light pulses into a field of view and the light reflects from one or more objects by backscattering. Thus, a direct ToF system in which the light pulses (e.g., light beams of visible light, infrared light and/or NIR light)) are emitted into the field of view, and a photodetector array detects and measures the reflected beams. For example, an array of photodetectors receives reflections from objects illuminated by the light.

In direct ToF systems, differences in return times for each light pulse across multiple photodetector of the photodetector array can then be used to make digital 3D representations of an environment or to generate other sensor data. For example, the light source may emit a single light pulse, and a time-to-digital converter (TDC) electrically coupled to the photodetector array may count from the time the light pulse is emitted, corresponding to a start signal, until a time the reflected light pulse is received at the receiver (i.e., at the photodetector array), corresponding to a stop signal. The "time-of-flight" of the light pulse is then translated into a distance. In another example, an analog-to-digital converter (ADC) may be electrically coupled to the photodetector array (e.g., indirectly coupled with intervening elements in-between) for pulse detection and ToF measurement. For example, an ADC may be used to estimate a time interval between start/stop signals with an appropriate algorithm.

A scan such as an oscillating horizontal scan (e.g., from left to right and right to left of a field of view) can illuminate a scene in a continuous scan fashion. Each firing of the laser beam by the light sources can result in a scan line in the "field of view." By emitting successive light pulses in different scanning directions, an area referred to as the field of view can be scanned and objects within the area can be detected and imaged.

In one example, for each distance sampling, a microcontroller triggers a laser pulse from a light source and also starts a timer in a Time-to-Digital Converter (TDC) Integrated Circuit (IC). The laser pulse is propagated through transmission optics, reflected by the target field, and captured by one or more receiving photodiodes of the photodetector array. Each receiving photodiode uses a photoelectric effect to emit a short electrical pulse in response to received light photons and the electrical pulse is read out by an analog readout circuit. For example, the electrical pulse may be an electrical current produced by the conversion of light photons into electrons. Each signal that is read out of the analog readout circuit may be amplified by an electrical signal amplifier.

A comparator IC recognizes the electrical pulse and sends a digital signal to the TDC to stop the timer. The TDC uses a clock frequency to calibrate each measurement. The TDC sends the serial data of the differential time between the start and stop digital signals to the microcontroller, which filters out any error reads, averages multiple time measurements, and calculates the distance to the target at that particular field position. By emitting successive light pulses in different directions established by a scanning mirror, an area (i.e., a field of view) can be scanned, a three-dimensional image can be generated, and objects within the area can be detected.

The signal processing chain of the receiver may also include an ADC for each photodiode or for a group of photodiodes. An ADC is configured to convert the analog electrical signals from the photodiodes or group of photodiodes into a digital signal that is used for further data processing.

In addition, instead of using the TDC approach, ADCs may be used for signal detection and ToF measurement. For example, each ADC may be used to detect an analog electrical signal from one or more photodiodes to estimate a time interval between a start signal (i.e., corresponding to a timing of a transmitted light pulse) and a stop signal (i.e., corresponding to a timing of receiving an analog electrical signal at an ADC) with an appropriate algorithm.

FIG. 1 is a schematic block diagram of a three-dimensional (3D) depth camera system 100 according to one or more embodiments. The 3D depth camera system 100 includes a 3D depth camera 1 and an object 2. The object 2 may be one or more objects that make up a 3D scene for imaging. The 3D depth camera system 100 uses a ToF-based 3DI sensor concept, using indirect depth measurement with continuously modulated illumination signals sourcing an illumination unit, and a modulated sensor core, where on a photodetector-basis received light is demodulated by a pixel modulation signal. In other words, light at each photodetector is demodulated by the pixel modulation signal.

The 3D depth camera 1 is an image sensor that includes a ToF sensor 3 (e.g., a sensor chip) comprising various components for performing depth measurement. The 3D depth camera 1 also includes an illumination unit 4 and imaging optics 5 (e.g., a lens). The illumination unit 4 may be an illumination source such as a such as a light emitting diode (LED) or a vertical-cavity surface-emitting laser (VCSEL) configured to emit a modulated light signal (e.g., modulated visible light, IR light, and/or NIR light), or any other suitable light source configured to emit a modulated illumination signal (e.g., modulated light signal). The illumination unit 4 may be configured to emit the modulated light towards object 2, and the imaging optics 5 (e.g., a lens) may be configured to receive reflected modulated light that is reflected from the surface of the object 2. In some instances, the illumination unit 4 may include multiple light sources that generate light at two different wavelengths in different spectrums. For example, the illumination unit 4 may include one or more light sources that emit visible light and one or more light sources that emit NIR light or IR light. A controller may selectively activate different wavelength bands for emission by selectively activating respective light sources such that they emit light according to the desired wavelength band or bands. Different wavelength bands may be emitted simultaneously or separately, at different times. It will be appreciated that the terms "light signal" and "illumination signal" may be used interchangeably herein.

The illumination unit 4 may be further configured to emit the modulated light towards the object 2 using illumination optics (e.g., a lens or a diffractive optical element (DOE)). Thus, using the illumination optics, the illumination unit 4 may illuminate only a field of view (FOV) of the image sensor 1.

The imaging optics 5, which may be an imaging lens system or objective including one or more lenses or DOEs, is configured to receive reflected light that is reflected from object 2 (i.e., objects of a 3D scene). The reflected light is directed by the imaging optics 5 at a photodetector array 6 of a sensor core 7.

The sensor chip 3 includes the sensor core 7, which includes photodetector array 6, an illumination driver 8, a modulation driver 9, and a control unit 10. The control unit includes two phase lock loop (PLL) circuits 11 and 12, a sequence controller 13, and a processing unit 14 configured to receive electrical signals generated by the photodetector array 6 and calculate a time-of-flight corresponding to each photodetector of the photodetector array 6 (e.g., corresponding to each electrical signal). The processing unit 14 may then generate a 3D map of the captured image using the calculated time-of-flight from each photodetector. The processing unit 14 may be a processor, a processing circuit that includes one or more signal processing components (e.g., amplifier, ADC, TDC, phase detector, etc.) and a processor, and/or microcontroller with processing capabilities.

For example, a plurality of N readout channels 16 may be used to couple the processing unit 14 to the photodetector array 6 in order to read out electrical signals generated by the photodetectors. The sensor core 7 includes a multiplexer 15 that couples a photodetector or a group of photodetectors of the photodetector array to a corresponding readout channel that is assigned thereto. The sequence controller 13 is configured to change the photodetector assignments to the readout channels 16 so that different photodetectors can be read out at different times by different readout channels 16. This helps to reduce the complexity of the readout circuit needed to readout the full photodetector array. Each readout channel is coupled to a corresponding ADC at the processing unit 14, where each ADC is configured to receive electrical signals from the photodetector or group of photodetectors that is coupled to the assigned readout channel. The sequence controller 13 may also choose which light sources are activated at the illumination unit 4 and, by doing so, may control which wavelength bands are emitted into the field of view (e.g., visible light, IR light, and/or NIR light).

The PLL circuits 11 and 12, together, may form a modulator to modulate one or more driver signals. A first PLL 11 may be configured to control a modulation signal $f_{Illu}$ via the illumination driver 8 and a second PLL 12 may be configured control a modulation signal $f_{mod}$ via the modulation driver 9. Thus, under control of the first PLL 11, the illumination driver 8 is configured to generate the illumination modulation signal $f_{Illu}$ having a first modulation frequency. Similarly, under control of the second PLL 12, the modulation driver 9 is configured to generate the sensor core (photodetector) modulation signal $f_{mod}$ having a second modulation frequency. The PLLs 11 and 12 are configured such that the first and the second modulation frequencies may have a predetermined frequency difference greater than zero for at least a portion of the image acquisition time for each of the image acquisitions.

Thus, the 3D depth camera 1 is configured to emit modulated IR light and measure the time the IR signal takes to travel from the depth camera 1 to the 3D scene 2 and back again. The elapsed time, referred to as a "time-of-flight," enables the 3D depth camera 1 to generate raw image data on a photodetector-by-photodetector basis and output the raw image data to the processing unit 14. In particular, the 3D depth camera 1 may be a continuous modulation ToF camera that measures the time-of-flight by using or determining a phase difference between the reflected modulated light and the modulation signal $f_{mod}$. For example, a phase difference can be translated to a distance based on the known frequency difference and an image acquisition time. Thus, a depth (distance) to the object can be determined from the phase difference information determined upon receipt of the reflected modulated light.

As will be described in more detail below, the predetermined frequency difference may be set to be greater than zero for all or part of an integration time, all or part of a waiting time, or for all or part of an image acquisition time for each of a multiple image acquisitions taken at different image acquisition times. At other times, the frequencies of the modulation signals $f_{mod}$ and $f_{Illu}$ may be equal such that there is no frequency difference therebetween.

During depth measurement, the illumination driver 8 may be configured to receive a control signal from the first PLL 11, and output the modulation signal fmu to the illumination unit 4 according to the control signal. The illumination unit 4 then generates a modulated light signal based on the illumination modulation signal $f_{Illu}$.

During depth measurement, the modulation driver 9 may be configured to receive a control signal from the second PLL 12, and output the sensor core modulation signal $f_{mod}$ to a photodetector array 6 of a sensor core 7 according to the control signal. While not shown, the modulation driver 9 may generate a plurality of modulation signals $f_{mod}$ that are received by the sensor core 7, each with a same modulation frequency and phase, to control the modulation frequency of the ToF photodetectors of the photodetector array 6. Thus, when modulation signal $f_{mod}$ is referenced herein, it will be understood that this may include one or more signals with the same modulation frequency and phase for modulating the photodetectors of the photodetector array 6.

The photodetector array 6 may be a 224×172 photodetector matrix, but is not limited thereto. The photodetector array 6 may be configured to receive the reflected IR signal from the imaging optics 5 and demodulate the reflected IR signal using the modulation signal $f_{mod}$ such that a phase difference (i.e., phase shift) between the modulated (reflected) illumination signal and the modulated photodetector array 6 (e.g., signal $f_{mod}$) may be detected and measured. In particular, the photodetector array 6 may be configured to directly demodulate the reflected light.

Said differently, the sensor core 7 includes the photodetector array 6 modulated by the photodetector modulation signal $f_{mod}$, and a photodetector of the photodetector array 6 is configured to receive the modulated light signal reflected from object 2 as a reflected modulated light signal. The photodetector of the photodetector array 6 is further configured to demodulate the reflected modulated light signal using the photodetector modulation signal $f_{mod}$ during an image acquisition to generate a measurement signal. The photodetector is configured to generate a plurality of measurement signals based on a plurality of image acquisitions taken at different image acquisition times. Each photodetector or a subset of photodetectors of the photodetector array 6 may perform a similar process.

The processing unit 14 may be configured to receive the plurality of measurement signals from each photodetector (e.g., a plurality of measurement signals from each photodetector) and calculate the depth of the object 2 on a photodetector-by-photodetector basis based on the plurality of measurement signals using phase difference information embedded in each measurement signal. In particular, the processing unit 14 may calculate an absolute phase difference based on the phase difference values associated with the measurement signals for each photodetector, and translate the absolute phase difference into depth (distance) information. Thus, a 3D image of the object 2 can be generated, output, and/or displayed.

The sequence controller 13 may include one or more processors and a clock source, and may be configured to control each of the PLLs 11 and 12. That is, the sequence controller 13 may be configured to control the modulation frequencies implemented by the PLLs 11 and 12 for controlling the two modulation signals $f_{mod}$ and $f_{Illu}$ and the frequency difference therebetween. The sequence controller 13 may be an internal controller logic with which the processing unit 14 can communicate with or through which the processing unit 14 may parametrize the depth camera 1 in order to control one or more of the photodetector modulation and illumination modulation frequencies of $f_{mod}$ and $f_{Illu}$, respectively, the duration and timing of introducing the frequency difference during each image acquisition provided by the PLLs 11 and 12, or the definition of an image sequence having defined frame rate.

The first PLL circuit 11 and the second PLL circuit 12 may be coupled to each other such that they share a common clock source (e.g., provided by the sequence controller 13). Thus, the two frequencies of the illumination modulation signal $f_{Illu}$ and the photodetector modulation signal $f_{mod}$ are coupled to each other and can be derived from the same clock frequency. This allows for the frequency difference between the two frequencies to be constant and precise based on a desired frequency difference. In the event the frequency difference is greater than zero, it can be ensured that the phase difference between the modulation signals $f_{mod}$ and $f_{Illu}$ grows continuously and linearly over time in a consistent and expected manner. In the event that there is no frequency difference, it can be ensured that the phase difference between the modulation signals $f_{mod}$ and $f_{Illu}$ does not change over time and remains constant.

Thus, these two PLLs 11 and 12 may be programmed by the sequence controller 13 such that they differ slightly in frequency (e.g., a frequency difference 1 Hz or 0.1 Hz for modulation frequency of 80 MHz for example). A synchronous start of the two PLLs 11 and 12 for sensor photodetector modulation and illumination signal modulation can be achieved to start at phase difference of 0°, with a constant and continuously growing phase difference between the two modulation signals $f_{Illu}$ and $f_{mod}$ for at least part of an image acquisition time. That is, the frequency difference between the two modulation signals $f_{Illu}$ and $f_{mod}$ introduces a linear phase shift growing linearly with time. In principal, also a phase differences of greater than 360° can be used (phase ambiguity). By programming a certain frame rate, integration time, and waiting time, for example, by the processing unit 14, arbitrary but very precise and easily calculated phase differences can be chosen or determined for depth measurement.

The phase difference may also set by the sequence controller 13 to be constant for at least part of an image acquisition by setting the frequency of the illumination modulation signal $f_{Illu}$ to be the same as the frequency of the photodetector modulation signal $f_{mod}$. In this case, the frequency difference is equal to zero (i.e., there is no frequency difference) and the phase difference between the modulation signals $f_{mod}$ and $f_{Illu}$ does not change over time.

This programing of the set frequency difference allows a precisely controllable and, if wanted, continuously changeable phase difference between photodetector modulation signal $f_{mod}$ and the illumination modulation signal $f_{Illu}$ for the 3DI sensor. At other times, there may be no frequency difference, which provides a constant, unchanging phase difference for a certain period of time during an image acquisition time.

It will be appreciated that, while the use of two PLLs are described, other equivalent structures are also possible. For example, structures with a combined PLL or modulator structure may be implemented where the two different frequencies can be obtained. For example, a combined PLL structure may be implemented where the two different frequencies of the modulation signals $f_{mod}$ and $f_{Illu}$ are obtained. For example, the combined PLL structure may be a dedicated PLL circuit enabling output of two stable signals with coupled frequencies.

Figure 2A:
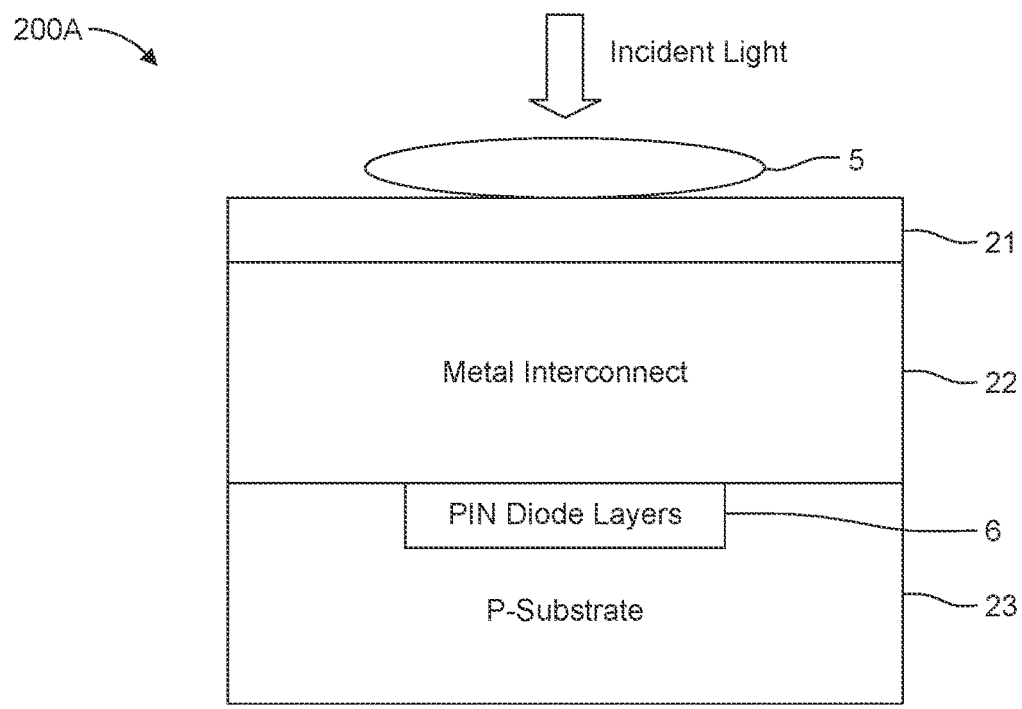
FIGS. 2A and 2B illustrate different configurations of ToF sensors according to one or more embodiments.
Figure 2B:
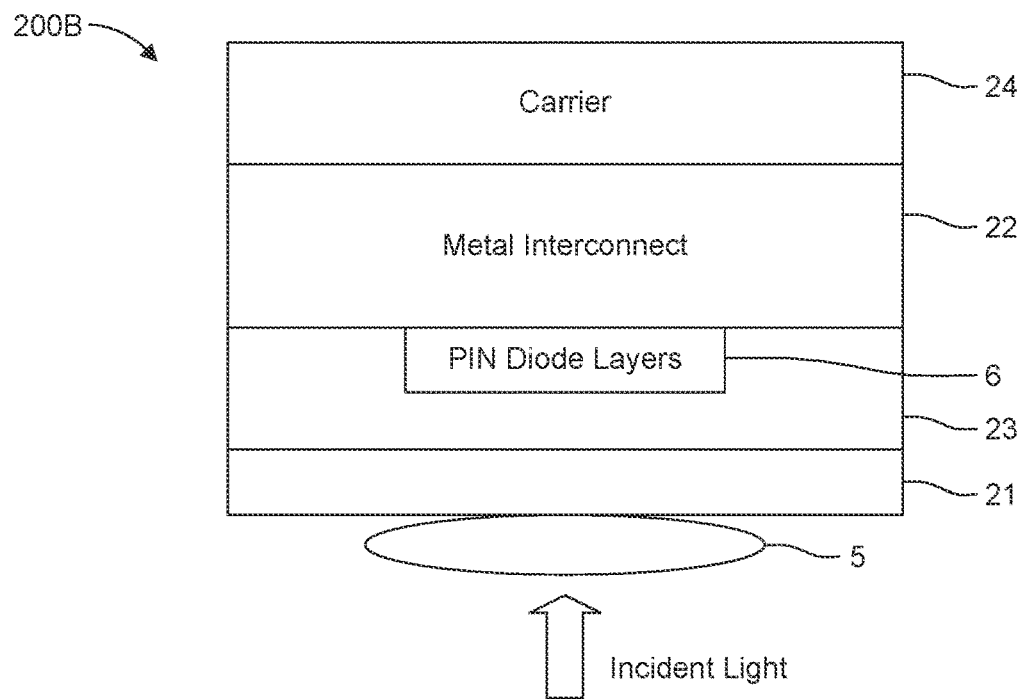

FIGS. 2A and 2B illustrate different configurations of ToF sensors according to one or more embodiments. In particular, FIG. 2A shows a front-illuminated configuration 200A of a ToF sensor and FIG. 2B shows a back-illuminated configuration 200B of a ToF sensor. In the front-illuminated configuration 200A, incident light (e.g., reflected light) is received at the frontside of the ToF sensor. Conversely, in the back-illuminated configuration 200A, incident light (e.g., reflected light) is received at the backside of the ToF sensor. Both the front-illuminated configuration 200A and the back-illuminated configuration 200B include similar elements.

The front-illuminated configuration 200A includes imaging optics 5 (e.g., a lens) and an optical filter coating 21 arranged at the frontside of the ToF sensor. The optical filter can have multiple coatings combined to provide multiple functions. In one embodiment, the optical filter could be an antireflective coating for the illumination wavelength. In another embodiment, the optical filter could be a narrow bandpass filter that allows transmission of a particular wavelength, e.g., the illuminated wavelength, and suppresses ambient light. In another embodiment, both functions can be combined as one optical filter.

Incident light passes through these elements towards the photodetector array 6. The front-illuminated configuration 200A further includes a metal interconnect layer 22 arranged between the antireflective coating 21 and a semiconductor substrate 23. The metal interconnect layer 22 includes a plurality of metal lines or conductive interconnects that serve as analog readout channels 16. The metal lines or the metal interconnect layer 22 are each connected to a photodetector (e.g., a photodiode) of the photodetector array 6 for reading out electrical signals that are produced via the photoelectric effect.

The front-illuminated configuration 200A further includes a semiconductor substrate 23 in which the photodetectors of the photodetector array 6 are formed. The semiconductor substrate 23 may be a p-doped silicon substrate or may be made of another type of suitably doped semiconductor material. The photodetectors of the photodetector array 6 may be PIN diodes that are comprised of PIN diode layers, including n-type semiconductor regions, p-type semiconductor regions, and intrinsic regions interposed between the n-type semiconductor regions and the p-type semiconductor regions. The n-type semiconductor regions, p-type semiconductor regions, and intrinsic regions are formed from the semiconductor substrate 23 according to known semiconductor processes. As a result, each PIN diode includes an n-type semiconductor region configured as a first ohmic contact, a p-type semiconductor region configured as a second ohmic contact, and an intrinsic region interposed between the n-type semiconductor region and the p-type semiconductor region.

Similarly, the back-illuminated configuration 200B includes imaging optics 5 (e.g., a lens) and an antireflective coating 21, but arranged at the backside of the ToF sensor. Incident light passes through these elements towards the photodetector array 6. The back-illuminated configuration 200B further includes the semiconductor substrate 23 in which the photodetectors of the photodetector array 6 are formed. Again, the photodetectors may be PIN diodes comprised of PIN diode layers. The back-illuminated configuration 200B further includes a metal interconnect layer 22 on the semiconductor substrate 23. The metal interconnect layer 22 includes a plurality of metal lines or conductive interconnects that serve as analog readout channels 16 that are electrically coupled to respective photodetectors for reading out electrical signals that are produced via the photoelectric effect. The back-illuminated configuration 200B may further include a carrier substrate 24 arranged on top of the metal interconnect layer 22 for providing structural support at the frontside of the ToF sensor.

Figure 3:
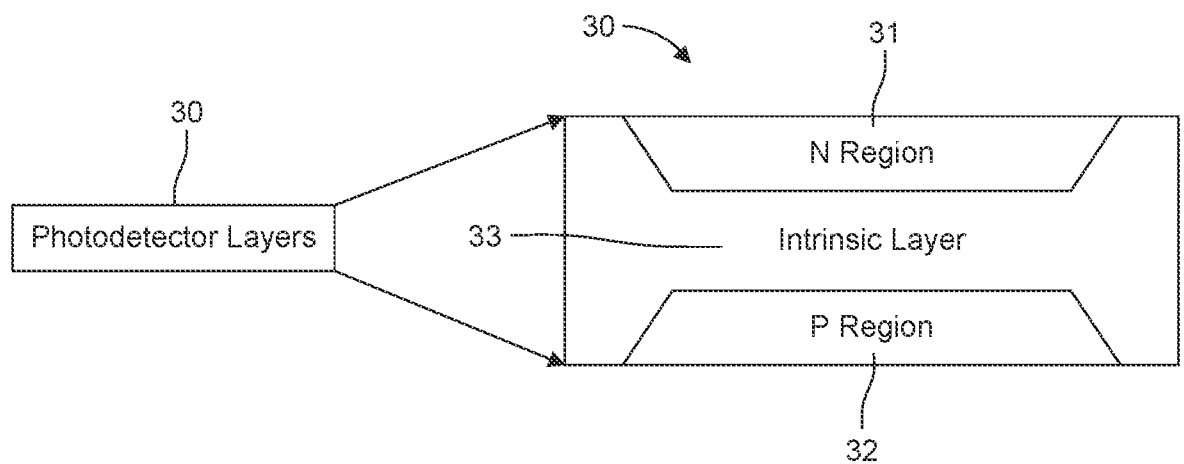
FIG. 3 shows photodetector layers of a photodetector of a photodetector array according to one or more embodiments.

FIG. 3 shows photodetector layers of a single photodetector 30 of a photodetector array according to one or more embodiments. As noted above, a photodetector may be a PIN diode that includes an n-type semiconductor region 31 configured as a first ohmic contact, a p-type semiconductor region 32 configured as a second ohmic contact, and an photosensitive layer 33 interposed between the n-type semiconductor region 31 and the p-type semiconductor region 32. In this example, the photosensitive layer 33 makes up the intrinsic region of the photodetector 30, thereby making the intrinsic region a light sensitive region. The photosensitive layer 33 may alternatively be referred to as a variable conduction region, a junction region, or a depletion region.

As a photodetector, the PIN diode is reverse-biased such that the cathode is driven positive with respect to the anode. Under reverse bias, the PIN diode ordinarily does not conduct, with the exception of some small dark current or leakage current.

The photosensitive layer 33 is injected with, and thus at least partially filled with, quantum dot (QD) particles that convert optical energy into electrical energy via the photoelectric effect to generate electrical current in response to receiving light having a wavelength in a wavelength band to which the QD particles are sensitive. In other words, the QD particles are sensitive to a particular wavelength or wavelength region of the electromagnetic spectrum.

When a photon of appropriate energy (i.e., the light has a wavelength within the sensitive region of the QD particles) enters the depletion region of the PIN diode and strikes a QD particle, the QD particle creates an electron-hole pair. This mechanism is also known as the inner photoelectric effect. The reverse-bias field sweeps the carriers out of the depletion region, creating current. The depletion region of a PIN structure extends across the photosensitive layer 33, deep into the device. This wider depletion width enables electron-hole pair generation deep within the device, which increases the quantum efficiency of the diode cell. Thus, holes move toward the anode and electrons toward the cathode, thereby producing a photocurrent that is read out by a readout channel of the metal interconnect layer 22. It is noted that PIN type diodes are more complex than other photodiodes, e.g., PN type photodiodes, heterojunction type photodetectors, or Schottky type diodes. The concepts proposed herein can be extended to these other diode types.

If multiple QD particles are struck by light photons with appropriate energy, each QD particle generates a corresponding electron-hole pair that contributes to the photocurrent that is produced by the PIN diode. In other words, the electrical current that is produced by the PIN diode is a sum of the photocurrents generated by the QD particles that are struck with light having a wavelength to which they are sensitive.

The photosensitive layer 33 may be referred to as a variable conduction region because the conduction in this region varies based on the properties of the QD particles and the light received. For example, some QD particles conduct or generate electrons depending on whether or not light to which they are sensitive is received thereby. Depending on the number of particles that are conducting, the magnitude of the electrical current produced by the variable conduction region of a photodetector varies. The number or particles that conduct or do not conduct in the variable conduction region of a photodetector varies over time according to the time-of-flight principle based on received light, the wavelength of the received light, and the timing of the received light.

Quantum dots (QDs) are semiconductor nanoparticles which exhibit composition and/or size-dependent optical and electronic (optoelectronic) properties. QDs are ultrasmall, typically falling in the size range between 1 and 14 nm, but are not limited thereto. One example material used for quantum dots is lead sulfide (PbS). QDs is an example of a light absorbing particle. QDs can be configured to have a particular peak wavelength sensitivity (i.e., absorption peak) by varying their size and composition. Accordingly, light having a wavelength at which a QD is sensitive triggers the QD's optoelectrical effect. A QD may be sensitive to narrow band of wavelengths with the peak wavelength sensitivity at the center of the narrow band. This band may be referred to as a narrow sensitivity band. A QD is most efficient at its optoelectrical effect when it receives light at its peak wavelength sensitivity. In contrast, light having a wavelength outside of a QD's narrow band will not cause the QD to produce any substantial current. To further insulate the photodetector from unwanted current generation from ambient light, the optical filter 5 in FIG. 2A and FIG. 2B provides additional suppression by blocking unwanted light to reach the light sensitive layer of the photodetector.

In the embodiments disclosed herein, the optoelectrical effect is a photo-electric effect. When a QD receives light having a wavelength at its peak wavelength sensitivity or within its narrow sensitivity band, the QD converts the photons of the light into electrons. In the embodiments disclose herein, the electrons produce an electrical current. In other words, a QD converts optical energy into electrical energy to generate an electrical current in response to receiving light having a wavelength at its peak wavelength sensitivity or within its narrow sensitivity band.

Figure 4:
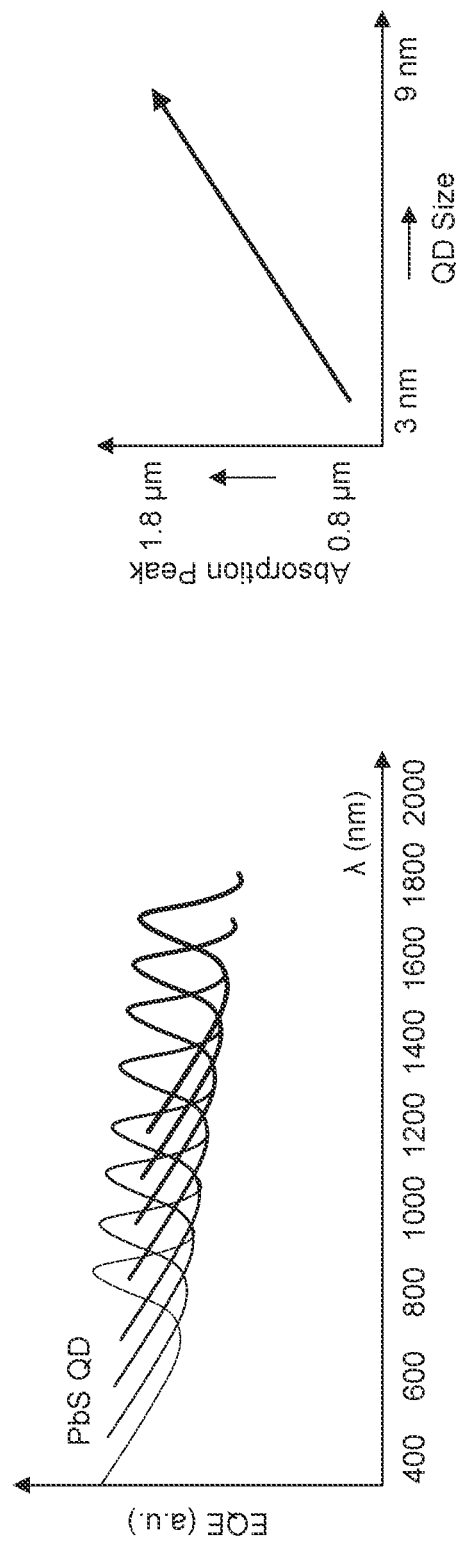
FIG. 4 shows an external quantum efficiency (EQE) curve (left) for a PbS quantum dot and an absorption peak dependency curve (right) that depends on the size of a quantum dot.

FIG. 4 shows an external quantum efficiency (EQE) curve (left) for a PbS quantum dot and an absorption peak dependency curve (right) that depends on the size of a quantum dot. On the left, eight different narrow sensitivity bands are shown, each with a corresponding peak wavelength sensitivity. Each peak wavelength sensitivity in the EQE curve depends on the size of the QD particle in accordance with the absorption peak dependency curve. Thus, the eight peak wavelength sensitivities are separate and distinct from each other (i.e., they are mutually exclusive from each other). Likewise, the wavelength range of each narrow sensitivity band depends on the size of the QD particle. Here, neighboring or adjacent sensitivity bands may partially overlap while non-adjacent sensitivity bands may be mutually exclusive from each other. In this way, the size of an QD particle may be used to tune the wavelength sensitivity of the QD particle. Thus, it can be said that a QD particle is resonant to a predetermined wavelength region. It is also noted that different materials can also be selected to provide sensitivity to a particular wavelength region. Hence a combination of QD composition and size can be used to make the photodetector sensitive to a particular wavelength region.

For example, the photosensitive layer 33 of a PIN diode may include a first plurality of quantum dot particles that are sensitive to a near infrared (NIR) region of an electromagnetic spectrum, wherein the first plurality of quantum dot particles of the PIN diode converts optical energy into electrical energy to generate a first electrical current in response to receiving NIR light having a wavelength in the NIR region. The processing unit 14 is configured to receive the first electrical current via the metal interconnect layer 22 and calculate a time-of-flight of the received NIR light having the wavelength in the first NIR region based on the first electrical current.

Additionally, the photosensitive layer 33 of the PIN diode may include a second plurality of quantum dot particles that are sensitive to a second NIR region of the electromagnetic spectrum, wherein the second NIR region is different from the first NIR region. As a result, the second plurality of quantum dot particles of the PIN diode converts optical energy into electrical energy to generate a second electrical current in response to receiving NIR light having a wavelength in the second NIR region. The processing unit 14 is configured to receive the second electrical current via the metal interconnect layer 22 and calculate a time-of-flight of the received NIR light having the wavelength in the second NIR region based on the second electrical current.

Providing quantum dot particles with sensitivities in two different NIR regions in the same PIN diode provides the PIN diode with a diverse sensitivity to different regions in the electromagnetic spectrum. The first NIR region and the second NIR region may be mutually exclusive NIR regions of the electromagnetic spectrum. For example, the first NIR region and the second NIR region may be respective narrow sensitivity bands that have no overlap. Alternatively, the first NIR region and the second NIR region may partially overlap. For example, the first NIR region and the second NIR region may be respective narrow sensitivity bands that partially overlap. In each case, the first plurality of quantum dot particles have a first wavelength peak sensitivity and the second plurality of quantum dot particles have a second wavelength peak sensitivity, wherein the first peak sensitivity and the second peak sensitivity occur at different wavelengths.

The illumination unit 4 may include diverse light sources that are configured to emit light in the two different NIR regions. For example, the illumination unit 4 may include at least one first light source configured to emit the NIR light having a wavelength in the first NIR region and at least one second light source configured to emit the NIR light having a wavelength in the second NIR region. The received NIR light having the wavelength in the first NIR region originates from the at least one first light source and is reflected back from one or more objects and the received NIR light having the wavelength in the second NIR region originates from the at least one second light source and is reflected back from one or more objects. It is also noted that the optical filter 5 can be configured as a dual or multiple wavelength range optical filter corresponding to the wavelengths of the two (or more) illumination sources (i.e., two or more wavelength regions).

This diversity in light sources and QD particles enables the depth camera 1 to enter into different modes with one mode for emitting the NIR light having a wavelength in the first NIR region, another mode for emitting the NIR light having a wavelength in the second NIR region, and a further mode for emitting the NIR light having wavelengths in both the first and the second NIR regions. The modes may be selected by the sequence controller 13 based on, for example, a desired detection range or existing environmental conditions (e.g., weather conditions, time of day, etc.).

Alternatively, or additionally, the photosensitive layer 33 of the PIN diode may include a plurality of visible light particles sensitive to a visible light region of the electromagnetic spectrum. These visible light particles may be larger in size than the QD particles that are sensitive to NIR light and/or may be made of a different material such that they are sensitive to visible light. However, the visible light particles themselves may be another set of QD particles that have a sensitivity that is diverse from the NIR-sensitive QD particles. Accordingly, the plurality of visible light particles converts optical energy into electrical energy to generate an electrical current in response to receiving visible light having a wavelength in the visible light region. The processing unit 14 is configured to receive this electrical current via the metal interconnect layer 22 and calculate a time-of-flight of the received visible light having the wavelength in the visible light region based on this electrical current.

The plurality of visible light particles may be intermixed in the photosensitive layer with a plurality of quantum dot particles that are sensitive to an NIR region. The illumination unit 4 may include diverse light sources that are configured to emit light in an NIR region and a visible light region. For example, the illumination unit 4 may include at least one first light source configured to emit NIR light having a wavelength in the first NIR region and at least one second light source configured to emit visible light having a wavelength in the visible light region. The received NIR light having the wavelength in the first NIR region originates from the at least one first light source and is reflected back from one or more objects and the received visible light having a wavelength in the visible light region originates from the at least one second light source and is reflected back from one or more objects.

This diversity in light sources and light absorbing particles enables the depth camera 1 to enter into different modes with one mode for emitting the NIR light having a wavelength in the first NIR region, another mode for emitting the visible light having a wavelength in the visible light region, and a further mode for emitting both the NIR light and the visible light. The modes may be selected by the sequence controller 13 based on, for example, a desired detection range or existing environmental conditions (e.g., weather conditions, time of day, etc.). It will also be appreciated that QD particles sensitive to the second NIR region may also be added to further diversity the sensitivity of the PIN diode and add additional modes of operation. Likewise, additional types of light sources and/or optical filters to accommodate these different wavelengths may be added for performing ToF measurements.

Alternatively, or additionally, the photosensitive layer 33 of the PIN diode may include a plurality of quantum dot particles sensitive to an IR region of the electromagnetic spectrum. The IR region may be a narrow sensitivity band located within a wavelength range of 2500 nm to 10,000 nm. These quantum dot particles are configured by size and/or material to convert optical energy into electrical energy to generate an electrical current in response to receiving IR light having a wavelength in the IR region. The processing unit 14 is configured to receive this electrical current via the metal interconnect layer 22 and calculate a time-of-flight of the received IR light having the wavelength in the IR region based on this electrical current.

The plurality of quantum dot particles sensitive to the IR region may be the only light absorbing particles deposited in the photosensitive layer. In this case, the illumination unit 14 includes at least one light source configured to emit the IR light having a wavelength in the IR region.

Alternatively, the plurality of quantum dot particles sensitive to the IR region may be intermixed with other light absorbing particles in the photosensitive layer, which may include a plurality of quantum dot particles that are sensitive to an NIR region and/or a plurality of visible light particles sensitive to a visible light region. The illumination unit 4 may include diverse light sources that are configured to emit light in an NIR region, an IR region, and/or a visible light region depending on the types of light absorbing particles provided in the photosensitive layer. For example, the illumination unit 4 may include at least one first light source configured to emit NIR light having a wavelength in the first NIR region and at least one second light source configured to emit IR light having a wavelength in the IR region. The received NIR light having the wavelength in the first NIR region originates from the at least one first light source and is reflected back from one or more objects and the received IR light having a wavelength in the IR region originates from the at least one second light source and is reflected back from one or more objects. The illumination unit 4 may further include at least one third light source configured to emit visible light having a wavelength in the visible light region.

This diversity in light sources and light absorbing particles enables the depth camera 1 to enter into different modes with one mode for emitting the NIR light having a wavelength in the first NIR region, another mode for emitting the IR having a wavelength in the IR region, and a further mode for emitting both the NIR light and the IR light.

The modes may be selected by the sequence controller 13 based on, for example, a desired detection range or existing environmental conditions (e.g., weather conditions, time of day, etc.). It will also be appreciated that QD particles sensitive to the second NIR region or the visible light region may also be added to further diversity the sensitivity of the PIN diode and add additional modes of operation. Likewise, additional types of light sources to accommodate these different wavelengths may be added for performing ToF measurements. Thus, sequence controller 13 may be configured with additional modes, such as a further mode for emitting the visible light having a wavelength in the visible light region, and a further mode for emitting both the IR light and the visible light simultaneously, a further mode for emitting both the NIR light and the visible light simultaneously, and a further mode for emitting NIR light, IR light, and the visible light simultaneously. The photocurrents produced from different sets of QDs of different sensitivities in a same ToF frame can be combined (e.g., summed or averaged) in order to generate a 3D map of the captured image.

Figure 5A:
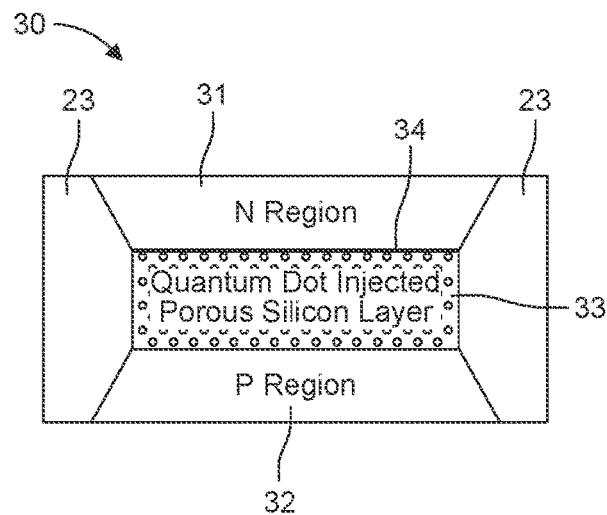
FIGS. 5A-5C show examples of different photosensitive layer structures of photodetector of a photodetector array according to one or more embodiments.
Figure 5B:
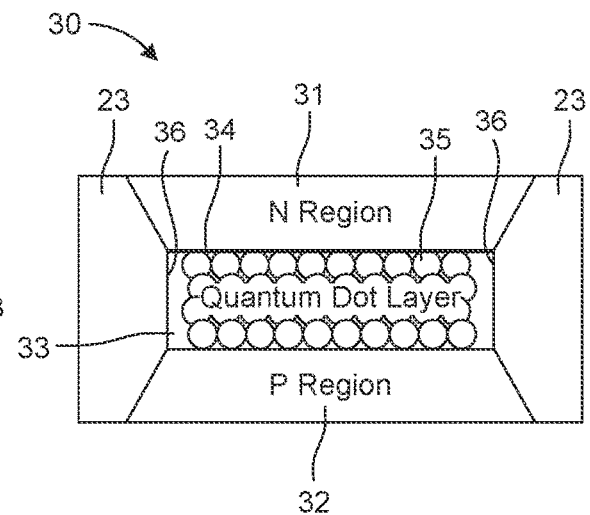
Figure 5C:
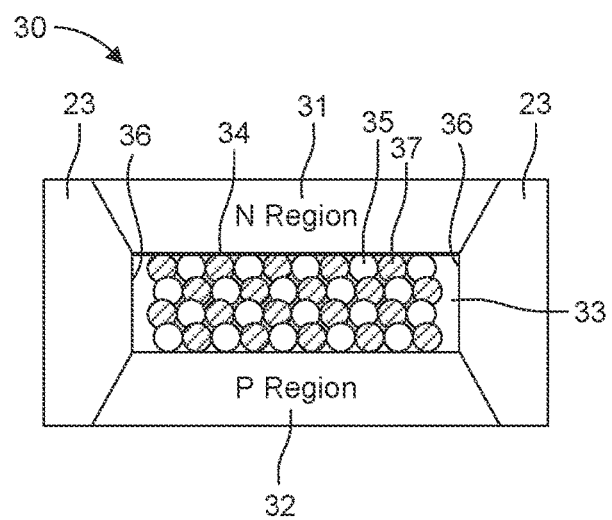

FIGS. 5A-5C show examples of different photosensitive layer structures of photodetector 30 of a photodetector array according to one or more embodiments.

In FIG. 5A, the photosensitive layer 33 is composed of a porous layer or substrate that comprises nanopores. For example, the photosensitive layer 33 may be composed of porous silicon comprising nanopores formed in the semiconductor substrate 23. Porous silicon is a form of silicon that has nanopores introduced in its microstructure, rendering a large surface to volume ratio in the order of 500 m$^2$/cm$^3$. Porous silicon has photoluminescence properties along with several other unique features, including a large surface area within a small volume, controllable pore sizes, convenient surface chemistry, and compatibility with conventional silicon microfabrication technologies. In addition, the quantum dots or other light absorbing particles are injected or otherwise disposed in the nanopores of the porous material. The light absorbing particles are small enough to reside in the nanopores of the porous material of the photosensitive layer 33. Thus, the porous material serves as a host layer for the light absorbing particles.

In case of using porous silicon, the active semiconductor substrate 23 can be wet etched by using an acid, e.g., HF acid, and applying selected voltages to etch away portions of the semiconductor substrate 23 and convert this to a porous silicon layer. Once that is achieved, one can using inkjet printing, spin coating, or stamping techniques to deposit quantum dots or other light absorbing particles into the nanopores of the porous silicon. An optional passivation layer 34 can be applied to seal the quantum dots or other light absorbing particles into the photosensitive layer 33 and prevent degradation. The passivation layer 34 may have an angstrom level thickness of SiO2 which is usually transparent at that thickness so as to not reduce the sensitivity of the photosensitive layer 33.

In FIG. 5B, the photosensitive layer 33 is composed of a stand alone layer of QD particles. That is the photosensitive layer comprises a quantum dot layer formed exclusively of quantum dot particles 35. The quantum dot particles 35 may be sensitive to an NIR region or an IR region as described above. Thus, these quantum dot particles 35 can be used as a sandwiched layer between the N region 31 and the P region 32.

During manufacturing, a pocket, a cavity, a well, or a trench can be created in the semiconductor substrate 23, in this case above the P region 32, using photolithographic techniques and then subsequently be filled with quantum dot material using inkjet printing, spin coating, or stamping techniques to deposit quantum dot particles 35 into the photosensitive layer 33 (i.e., into the pocket, cavity, well, or trench). The pocket, cavity, well, or trench is defined by interior sidewalls 36 of the semiconductor substrate 23, which are used to hold the quantum dot particles 35 within the photosensitive layer 33. An optional passivation layer 34 can be applied on top of the quantum dot layer to seal the quantum dot particles 35 or other light absorbing particles into the photosensitive layer 33 and prevent degradation.

In FIG. 5C, the photosensitive layer 33 is composed of an intermixed layer of light absorbing particles that include quantum dot particles 35 and light absorbing particles 37. The quantum dot particles 35 may be sensitive to a first NIR region as described above, whereas the light absorbing particles 37 may be sensitive to a second NIR region, a visible light region, or an IR region as described above. In this way, a diverse sensitivity to different wavelength ranges or bands can be achieved within the photosensitive layer 33. As note above, three or more pluralities of quantum dot particles, each with different sensitivity wavelength bands, may be intermixed in the photosensitive layer 33 to provide diverse sensitivity to different spectra of light.

During manufacturing, a pocket, a cavity, a well, or a trench can be created in the semiconductor substrate 23, in this case above the P region 32, using photolithographic techniques and then subsequently be filled with an intermixed layer of light absorbing particles using inkjet printing, spin coating, or stamping techniques to deposit quantum dot particles 35 and light absorbing particles 36 into the photosensitive layer 33 (i.e., into the pocket, cavity, well, or trench). The pocket, cavity, well, or trench is defined by interior sidewalls 36 of the semiconductor substrate 23, which are used to hold the quantum dot particles 35 within the photosensitive layer 33. An optional passivation layer 34 can be applied on top of the quantum dot layer to seal the quantum dot particles 35 or other light absorbing particles into the photosensitive layer 33 and prevent degradation. It will be appreciated that a similar intermixing of light absorbing particles can also be applied to the nanopores of the porous material described in reference to FIG. 5A.

Although some aspects of this disclosure are described in the context of a PIN diode, as it is one of the most complex photodiode structures, the described principle can be applied to other types of diodes or photodetectors as well. It is noted that in different configurations, the quantum dot particles can be injected into an intrinsic layer, or a p-type layer, or even be used as a separate layer sandwiched between two ohmic contacts.

More specifically, in a PN type photodiode, there is no need of an intrinsic layer but rather the diode can be made to work by injecting quantum dot particles in a doped semiconductor layer, e.g., P type layer, that is in contact with an oppositely doped layer, e.g., N type layer. This PN photodiode can be sandwiched between ohmic contacts. Yet in another embodiment, the quantum dot layer can be combined with a hole transparent layer to form a heterojunction photodiode. Yet in another embodiment, the quantum dot layer could be sandwiched directly between two ohmic contact layers thus forming a Schottky photodiode.

In view of the above, NIR or IR quantum dots inside the photodetector enable silicon to act as an NIR or IR detector. These NIR or IR quantum dots can be intermixed with each other and/or with visible light quantum dots to enable diverse sensitivity. This technology provides a low-cost path to enable dual wavelength operation as this does not require a resin-UV cure solution. Additionally, the NIR or IR quantum dots enable uncooled detection in that the ToF sensor 3 does not need to be cooled during operation.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer, or an electronic circuit. In some embodiments, some one or more of the method steps may be executed by such an apparatus.

It is further to be noted that methods disclosed in the specification or in the claims may be implemented by a device having means for performing each of the respective acts of these methods. Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application-specific integrated circuits (ASICs), field programmable logic arrays (FPGAs), programmable logic controller (PLC), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure. A control unit may use electrical signals and digital algorithms to perform its receptive, analytic, and control functions, which may further include corrective functions. Such hardware, software, and firmware may be implemented within the same device or within separate devices to support the various techniques described in this disclosure.

One or more aspects of the present disclosure may be implemented as a non-transitory computer-readable recording medium having recorded thereon a program embodying methods/algorithms for instructing the processor to perform the methods/algorithms. Thus, a non-transitory computer-readable recording medium may have electronically readable control signals stored thereon, which cooperate (or are capable of cooperating) with a programmable computer system such that the respective methods/algorithms are performed. The non-transitory computer-readable recording medium can be, for example, a RAM, a ROM, a PROM, an EPROM, an EEPROM, a FLASH memory, or an electronic memory device.

Although various embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A time-of-flight sensor, comprising:
a photodetector array comprising a plurality of photodetectors, wherein each photodetector of the photodetector array includes a silicon-based, light-sensitive diode comprising:
a photosensitive layer comprising a plurality of quantum dot particles sensitive to a near infrared (NIR) region of an electromagnetic spectrum, wherein the plurality of quantum dot particles are configured to convert optical energy into electrical energy to generate an electrical current in response to receiving NIR light having a wavelength in the NIR region; and
a processing circuit configured to receive the electrical current and calculate a time-of-flight of the received NIR light based on the electrical current,
wherein the photosensitive layer is a quantum dot layer formed exclusively of the plurality of quantum dot particles,
wherein the silicon-based, light-sensitive diode comprises a first ohmic contact and a second ohmic contact, and the silicon-based, light-sensitive diode comprises a passivation layer interposed between the first ohmic contact and the quantum dot layer or between the second ohmic contact and the quantum dot layer,
wherein the first ohmic contact is a semiconductor region having a first doping type,
wherein the second ohmic contact is a semiconductor region having a second doping type opposite to the first doping type, and wherein the photosensitive layer is interposed between the first ohmic contact and the second ohmic contact.

2. The time-of-fight sensor of claim 1, wherein the electrical current is a sum of photocurrents generated by the plurality of quantum dot particles.

3. The time-of-fight sensor of claim 1, wherein the NIR region is within a wavelength range of 800-2500 nm.

4. The time-of-fight sensor of claim 1, wherein the plurality of quantum dot particles are resonant to a predetermined wavelength region in the NIR region.

5. The time-of-fight sensor of claim 1, wherein the silicon-based, light-sensitive diode is a PN photodiode, a Schottky diode, or a heterojunction diode.

6. A time-of-flight sensor, comprising:
a photodetector array comprising a plurality of photodetectors wherein each photodetector of the photodetector array includes a silicon-based, light-sensitive diode comprising:
a photosensitive layer comprising a plurality of quantum dot particles sensitive to a near infrared (NIR) region of an electromagnetic spectrum, wherein the plurality of quantum dot particles are configured to convert optical energy into electrical energy to generate an electrical current in response to receiving NIR light having a wavelength in the NIR region; and
a processing circuit configured to receive the electrical current and calculate a time-of-flight of the received NIR light based on the electrical current,
wherein the photodetector array comprises a semiconductor substrate in which the plurality of photodetectors are formed,
wherein, for each silicon-based, light-sensitive diode, the semiconductor substrate comprises a pocket or a well that is filled with the plurality of quantum dot particles, wherein the pocket or the well is defined by interior sidewalls of the semiconductor substrate,
wherein the silicon-based, light-sensitive diode comprises a first ohmic contact and a second ohmic contact, and the silicon-based, light-sensitive diode comprises a passivation layer interposed between the first ohmic contact and the photosensitive layer or between the second ohmic contact and the photosensitive layer,
wherein the first ohmic contact is a semiconductor region having a first doping type,
wherein the second ohmic contact is a semiconductor region having a second doping type opposite to the first doping type, and
wherein the photosensitive layer is interposed between the first ohmic contact and the second ohmic contact.

7. A time-of-flight sensor, comprising:
a photodetector array comprising a plurality of photodetectors wherein each photodetector of the photodetector array includes a silicon-based, light-sensitive diode comprising:
a photosensitive layer comprising a plurality of quantum dot particles sensitive to a near infrared (NIR) region of an electromagnetic spectrum, wherein the plurality of quantum dot particles are configured to convert optical energy into electrical energy to generate an electrical current in response to receiving NIR light having a wavelength in the NIR region; and
a processing circuit configured to receive the electrical current and calculate a time-of-flight of the received NIR light based on the electrical current,
wherein the photodetector array comprises a semiconductor substrate in which the plurality of photodetectors are formed,
wherein the photosensitive layer of each silicon-based, light-sensitive diode comprises porous silicon comprising nanopores formed in the semiconductor substrate and the plurality of quantum dot particles are disposed in the nanopores,
wherein the silicon-based, light-sensitive diode comprises a first ohmic contact and a second ohmic contact, and the silicon-based, light-sensitive diode comprises a passivation layer interposed between the first ohmic contact and the photosensitive layer or between the second ohmic contact and the photosensitive layer,
wherein the first ohmic contact is a semiconductor region having a first doping type,
wherein the second ohmic contact is a semiconductor region having a second doping type opposite to the first doping type, and
wherein the photosensitive layer is interposed between the first ohmic contact and the second ohmic contact.

8. The time-of-fight sensor of claim 1, wherein:
the plurality of quantum dot particles is a first plurality of quantum dot particles, the NIR region is a first NIR region, and the electrical current is a first electrical current, the photosensitive layer includes a second plurality of quantum dot particles sensitive to a second NIR region of the electromagnetic spectrum, wherein the second NIR region is different from the first NIR region, wherein the second plurality of quantum dot particles are configured to convert optical energy into electrical energy to generate a second electrical current in response to receiving NIR light having a wavelength in the second NIR region, and
the processing circuit is configured to receive the second electrical current and calculate a time-of-flight of the received NIR light having the wavelength in the second NIR region based on the second electrical current.

9. The time-of-fight sensor of claim 8, wherein the first NIR region and the second NIR region are mutually exclusive NIR regions of the electromagnetic spectrum.

10. The time-of-fight sensor of claim 8, wherein the first NIR region and the second NIR region partially overlap.

11. The time-of-fight sensor of claim 8, wherein the first plurality of quantum dot particles have a first peak sensitivity and the second plurality of quantum dot particles have a second peak sensitivity, wherein the first peak sensitivity and the second peak sensitivity occur at different wavelengths.

12. The time-of-fight sensor of claim 1, wherein:
the plurality of quantum dot particles is a first plurality of quantum dot particles and the electrical current is a first electrical current,
the photosensitive layer includes a second plurality of quantum dot particles sensitive to a visible light region of the electromagnetic spectrum, wherein the second plurality of quantum dot particles are configured to convert optical energy into electrical energy to generate a second electrical current in response to receiving visible light having a wavelength in the visible light region, and
the processing circuit is configured to receive the second electrical current and calculate a time-of-flight of the received visible light based on the second electrical current.

13. The time-of-fight sensor of claim 12, wherein the second plurality of quantum dot particles is intermixed with the first plurality of quantum dot particles in the photosensitive layer.

14. The time-of-fight sensor of claim 1, wherein:
the plurality of quantum dot particles is a first plurality of quantum dot particles and the electrical current is a first electrical current,
the photosensitive layer includes a second plurality of quantum dot particles sensitive to an IR region of the electromagnetic spectrum, wherein the second plurality of quantum dot particles are configured to convert optical energy into electrical energy to generate a second electrical current in response to receiving infrared (IR) light having a wavelength in the IR region, and
the processing circuit is configured to receive the second electrical current and calculate a time-of-flight of the received IR light based on the second electrical current.

15. The time-of-fight sensor of claim 1, wherein the time-of-fight sensor is a front side illuminated sensor or a back side illuminated sensor.

16. The time-of-fight sensor of claim 1, further comprising:
at least one light source configured to emit the NIR light having a wavelength in the NIR region, wherein the received NIR light is the emitted NIR light reflected from an object.

17. The time-of-fight sensor of claim 8, further comprising:
at least one first light source configured to emit the NIR light having a wavelength in the first NIR region and at least one second light source configured to emit the NIR light having a wavelength in the second NIR region,
wherein the received NIR light having the wavelength in the first NIR region originates from the at least one first light source and is reflected back from an object and the received NIR light having the wavelength in the second NIR region originates from the at least one second light source and is reflected back from an object.

18. The time-of-fight sensor of claim 12, further comprising:
at least one first light source configured to emit the NIR light having a wavelength in the NIR region and at least one second light source configured to emit the visible light having a wavelength in the visible light region, wherein the received NIR light is the emitted NIR light reflected from an object and the received visible light is the emitted visible light reflected from an object.

19. The time-of-fight sensor of claim 14, further comprising:
at least one first light source configured to emit the NIR light having a wavelength in the NIR region and at least one second light source configured to emit the IR light having a wavelength in the IR region, wherein the received NIR light is the emitted NIR light reflected from an object and the received IR light is the emitted IR light reflected from an object.

20. The time-of-fight sensor of claim 19, wherein the IR region is within a wavelength range of 2500 nm to 10,000 nm.

21. A time-of-flight sensor, comprising:
a photodetector array comprising a plurality of photodetectors wherein each photodetector of the photodetector array includes a silicon-based, light-sensitive diode comprising:
a photosensitive layer comprising a plurality of quantum dot particles sensitive to an infrared (IR) region of an electromagnetic spectrum, wherein the plurality of quantum dot particles are configured to convert optical energy into electrical energy to generate an electrical current in response to receiving IR light having a wavelength in the IR region; and
a processing circuit configured to receive the electrical current and calculate a time-of-flight of the received IR light based on the electrical current,
wherein the silicon-based, light-sensitive diode comprises a first ohmic contact layer and a second ohmic contact layer that are reverse-biased,
wherein the photosensitive layer is an intrinsic layer interposed between the first ohmic contact layer and the second ohmic contact layer, and
wherein the plurality of quantum dot particles are injected into the intrinsic layer to create a PIN type photodiode.

22. A time-of-flight sensor, comprising:
a photodetector array comprising a plurality of photodetectors, wherein each photodetector of the photodetector array includes a variable conduction region comprising a plurality of quantum dot particles sensitive to a near infrared (NIR) region of an electromagnetic spectrum, wherein the plurality of quantum dot particles are configured to convert optical energy into electrical energy to generate an electrical current in response to receiving NIR light having a wavelength in the NIR region; and
a processing circuit configured to receive the electrical current and calculate a time-of- flight of the received NIR light based on the electrical current,
wherein each photodetector comprises a first ohmic contact layer and a second ohmic contact layer that are reverse-biased,
wherein the variable conduction region is an intrinsic layer interposed between the first ohmic contact layer and the second ohmic contact layer, and
wherein the plurality of quantum dot particles are injected into the intrinsic layer to create a PIN type photodiode.

23. A time-of-flight sensor, comprising:
a photodetector array comprising a plurality of photodetectors wherein each photodetector of the photodetector array includes a silicon-based, light-sensitive diode comprising:
a photosensitive layer comprising a first plurality of quantum dot particles sensitive to a first near infrared (NIR) region or a first infrared (IR) region of an electromagnetic spectrum, and a second plurality of quantum dot particles sensitive to a second NIR region or a second IR region of the electromagnetic spectrum,
wherein the first plurality of quantum dot particles have a first peak sensitivity and the second plurality of quantum dot particles have a second peak sensitivity, wherein the first peak sensitivity and the second peak sensitivity occur at different wavelengths,
wherein the first plurality of quantum dot particles are configured to convert optical energy into electrical energy to generate a first electrical current in response to receiving first light having a wavelength in the first NIR region or in the first IR region, and
wherein the second plurality of quantum dot particles are configured to convert optical energy into electrical energy to generate a second electrical current in response to receiving second light having a wavelength in the second NIR region or in the second IR region;

at least one first light source configured to emit the first light during a first mode;

at least one second light source configured to emit the second light during a second mode;

a sequence controller configured to switch between the first mode and the second mode; and a processing circuit configured, during the first mode, to receive the first electrical current and calculate a first time-of-flight corresponding to the first light based on the first electrical current, and configured, during the second mode, to receive the second electrical current and calculate a second time-of-flight corresponding to the second light based on the second electrical current, wherein the at least one first light source and the at least one second light source are configured to emit the first light and the second light during a third mode, respectively, wherein the sequence controller is configured to switch between the first mode, the second mode, and the third mode, and wherein the processing circuit configured to receive, during the third mode, the first electrical current and the second current, and calculate a third time-of-flight corresponding to the first light and the second light based on the first electrical current and the second electrical current.

24. The time-of-fight sensor of claim 23, wherein the sequence controller is configured to switch between the first mode and the second mode based on detecting a change in an environmental condition or based on detecting a change in a desired detection range.

* * * * *